2,794,299
Patented June 4, 1957

United States Patent Office

2,794,299
CONTROL OF BORON POISONING IN PLANTS

Seymour Thomas, Jr., Los Angeles, Calif., assignor to Crown Zellerbach Corporation, San Francisco, Calif., a corporation of Nevada No Drawing. Application December 6, 1954,
Serial No. 473,467

7 Claims. (Cl. 47—58)

The present invention relates to a composition and methods for inhibiting boron poisoning in plants. More particularly, this invention relates to an organic composition capable of preventing the detrimental action of an excessive quantity of boron which may be supplied to the plants and to methods by which such phytotoxic action of boron is controlled.

Boron is a chemical nutrient element which is necessary for normal development of many, if not all, plants when present in the soil in minute or moderate quantities. In contrast to this beneficial effect, when the concentration of boron in the soil exceeds the desirable limits, poisoning results from excessive intake of boron by the plants. The characteristic symptoms produced due to boron poisoning are browning or blackening of foliage, partial or complete defoliation, decreased plant vigor and growth, loss of crop yield, and possibly death of a plant.

The phytotoxic content of boron which exists in various compounds in the soil may occur in certain regions under natural conditions; it may be due to the use of fertilizers, such as potash salts which may contain boron in amounts harmful to plant growth, or quite frequently, it may be due to the use of irrigation water containing dissolved boron compounds in excessive amounts. For example, considerable damage to citrus crops in California was caused by irrigation water containing more than one-half part per million of boron. Another instance of boron toxicity occurred when potash sources containing considerable borax were used in potato and tobacco fertilizers. In some cases, as little as 30 pounds of the potash per acre resulted in greatly diminished yields, and applications in excess of 50 pounds per acre killed the plants. An excess of boron in the soil caused browning of leaves and premature leaf fall of walnuts.

Attempts have been made in the past to reduce boron poisoning in plants. These attempts were based on treating the soil with some inorganic chemicals, chiefly lime, to form boron compounds, such as calcium borates, which have low water-solubility, thus reducing the intake of boron by the plants. However, the use of lime for prevention of boron poisoning in plants has been found to be disadvantageous in several respects. Thus, when lime is applied to the soil in amounts higher than necessary for desirable plant growth conditions, it may affect the availability of other essential nutrient elements needed by plants from the soil; it may upset the soil structure and pH, resulting in unfavorable balance between various constituents available for absorption by plants; the excess of calcium in the plant cell may interfere with boron metabolism when the latter has been taken up by the plant in a quantity of desirable for its satisfactory development.

From the foregoing, it will be apparent that some agricultural regions are still confronted with the serious problem of boron poisoning in plants and that no suitable compound or satisfactory method to overcome this difficulty has been developed to date. It will be also apparent that any expedient by means of which boron poisoning in plants could be prevented without affecting adversely other soil conditions desirable for plant growth would constitute a significant achievement in connection with the utilization of agricultural lands rich in boron or lands irrigated with water containing phytotoxic amounts of boron, so that the fertility and productivity of such lands is markedly improved.

I have discovered that boron poisoning in plants may be prevented, without causing the unwanted effects mentioned above by treating the plants with the constituents of sulfite spent liquor, also known as sulfite waste liquor, derived from pulping fibrous raw materials by the sulfite process.

The principal object of my invention, therefore, is to provide a water-soluble, organic composition by which boron poisoning in plants may be inhibited.

Another equally important object of this invention is to provide methods for control and prevention of boron poisoning in plants by treating them with the composition comprising the constituents of sulfite spent pulping liquor.

Still another object of my invention is to provide a new application for a material which is very low in cost, and which has been considered for many years as a waste by-product of the paper pulp industry, namely, sulfite spent liquor.

The sulfite spent liquor is a well known conventional product obtained as a waste product from the pulping of wood or other lignocellulosic plants by the calcium-, ammonium-, magnesium-, or sodium-base cooking process. During the pulping process employed in the pulp and paper industry, the wood chips or other comminuted fibrous raw materials are cooked under pressure with a liquor containing essentially calcium-, ammonium-, magnesium-, or sodium bisulfite, sulfur dioxide and water. This liquor dissolves the lignin to a greater or lesser degree, as well as the sugars and other water-soluble constituents originally present in the lignocellulosic raw material. The resulting spent liquor is then separated from the pulp. Although its composition is somewhat variable depending upon the cooking conditions and the fibrous material used, its content of ligninsulfonates ranges generally between about 40% and about 70% by weight (dry basis), while the amount of sugars ranges from about 10% to about 40% by weight (dry basis).

For example, a typical liquor resulting from the pulping of western hemlock by the ammonium-base sulfite process contains about 11% solids having the composition shown in Table 1 wherein the miscellaneous constituents comprise wood extractives, waxes, fatty acids, sterols, and the like.

TABLE 1

| | Total solids, percentage by weight |
|---|---|
| Ammonium lignin sulfonates | 58.0 |
| Reducing sugars as glucose | 17.0 |
| Miscellaneous | 25.0 |

An advantageous product suitable for the purposes of the present invention is ammonium-base sulfite spent liquor produced and sold by the Crown Zellerbach Corporation under the trade-mark "Orzan" in aqueous solution form in a wide range of concentrations, as well as in form of a dry powder. Sulfite spent liquors having other bases, such as Ca, Mg, or Na are equally suitable in carrying out the objects of my invention.

Compositions containing such compounds useful for controlling boron poisoning in plants include aqueous solutions and dry powder. Aqueous solutions of sulfite spent liquor are conveniently prepared by mixing the liquor of known solids content (usually between about 11% for a liquor obtained from the digester and about 50% for a concentrated liquor) with a sufficient amount of water to give the desired concentration. Aqueous solutions may be also easily prepared by dissolving the dried sulfite spent liquor solids in water to produce a solution of a desired solids content.

As stated above, very small quantities of boron are necessary for normal development of plants, and slightly higher concentrations may cause injury. The boron content in a plant ranging from the desirable level to the excessive or toxic level may be only a few parts per million and it may vary according to the sensitivity of a plant to the amount of boron taken up.

For instance, limits for boron in irrigation water that have proved satisfactory have been proposed by C. S. Scofield ("The Salinity of Irrigation Water," Smithsn. Inst. Ann. Rpt., 1935, p. 275–287). These limits, given in parts per million, are shown in Table 2 for crops sensitive, semitolerant and tolerant to boron.

TABLE 2

| Classes of Irrigation Water | Sensitive Crops | Semitolerant Crops | Tolerant Crops |
|---|---|---|---|
| Excellent | less than 0.33 | less than 0.67 | less than 1.0. |
| Good | 0.33–0.67 | 0.67–1.33 | 1.0–2.0. |
| Permissible | 0.67–1.0 | 1.33–2.0 | 2.0–3.0. |
| Doubtful | 1.0–1.25 | 2.0–2.5 | 3.0–3.75. |
| Unsuitable | more than 1.25 | more than 2.5 | more than 3.75. |

The relative sensitivity of various crops to boron has been determined by F. M. Eaton in the U. S. Dept. Agr. Tech. Bul. 448 (1935), entitled "Boron in Soils and Irrigation Waters and its Effect on Plants, with Particular Reference to the San Joaquin Valley of California." Some of the crops are listed in Table 3.

TABLE 3

| Sensitive | Semitolerant | Tolerant |
|---|---|---|
| Lemon | Lima bean | Carrot |
| Grapefruit | Tomato | Lettuce |
| Avocado | Oat | Cabbage |
| Orange | Corn | Onion |
| Apricot | Wheat | Gladiolus |
| Peach | Barley | Alfalfa |
| Cherry | Olive | Sugar beet |
| Apple | Field pea | Date palm |
| Pear | Radish | Asparagus |
| Navy bean | Pima cotton | |
| Jerusalem-artichoke | Potato | |

It will be obvious to those skilled in the art that due to the variations in the sensitivity of many plants to boron, the quantity of the composition of the present invention to be used in order to substantially inhibit the phytotoxic action of boron will vary according to the type of plant that might be subjected to poisoning by boron, as well as depending on the amount of boron present either in the soil or in the irrigation water.

Whenever feasible, the amount of boron occurring in various compounds in the soil or irrigation water should be determined prior to the treatment with the composition of my invention. A rapid and accurate colorimetric method for the quantitative determination of boron, based upon its reaction with a solution of carmine in concentrated sulfuric acid, has been reported by J. T. Hatcher and L. V. Wilcox in Analytical Chemistry, vol. 22, p. 567 (April, 1950). This method is applicable in concentrations of boron from traces to several hundred parts per million and in such materials as waters, soil extracts, and plant materials.

For instance, knowing the amount of boron present in the water, a predetermined quantity of sulfite spent liquor may be added thereto so that the phytotoxic action of boron will be greatly reduced or substantially prevented, whereas the beneficial amount of boron below the toxic level will be still available for assimilation by the plant. Generally, the ratio of about 1 to 50 parts by weight of sulfite spent liquor solids to 1 part by weight of the boron atom usually present as borate, should suffice to attain a desired level at whict boron will not produce any deleterious effect on the plants.

The application of the composition of the invention for the treatment of the plant may be accomplished in a number of ways. For example, an aqueous solution of the composition may be applied to the affected areas of the plant by spraying or sprinkling. Similarly, the composition of this invention in form of an aqueous solution or in form of a dry powder may be applied to the soil surrounding the roots of the plant. When dry powder is employed, however, its application should be followed by a thorough watering of the treated area in order to dissolve the constituents of the composition and thus cause their movement into the ground. Alternatively, the solution or powdered composition may be added to the irrigation water at a predetermined rate.

The following examples illustrate, but in no way limit, the composition and the methods of applying the composition to plants in accordance with the present invention.

Example 1

Two halves of an Idaho potato were placed in two bowls, each containing tap water. After the two halves were allowed to sprout to a height of about 6 inches, the tap water was replaced in each bowl, as follows:

*Bowl A.*—an aqueous solution containing 133 parts per million by weight of borax ($Na_2B_4O_7 \cdot 10H_2O$), corresponding to about 15 parts per million by weight of boron;

*Bowl B.*—an aqueous solution containing 105 parts per million by weight of ammonium-base sulfite spent liquor solids, supplied by the Crown Zellerbach Corporation under the trademark of Orzan and having the composition of Table 1, and 133 parts per million by weight of borax ($Na_2B_4O_7 \cdot 10H_2O$).

The potato plants were then allowed to grow for a period of 3 weeks. At the end of this period, the plant placed in bowl A was nearly completely blackened and dead, whereas the plant placed in bowl B was about 6 inches taller than the former plant, and the ends of its shoots were barely beginning to wither. It was noted, therefore, that the phytotoxic effect of boron, clearly shown in bowl A, was substantially reduced in bowl B where the constituents of sulfite spent liquor were present.

Example 2

Three aqueous compositions were prepared, the first containing 15,000 p. p. m. by weight of the same sulfite spent liquor solids, as described in Example 1, the second containing 4450 p. p. m. by weight of borax

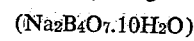
($Na_2B_4O_7 \cdot 10H_2O$)

corresponding to about 500 p. p. m. by weight of boron, and the third containing 15,000 p. p. m. of the same sulfite liquor solids and 4450 p. p. m. of borax, both amounts expressed by weight. Three 2 ft. x 3 ft. greenhouse plots were planted with tomato seeds. A few days after the plants emerged, the young plants and the soil in each plot were sprayed with 400 ml. of each of the above specified solutions, which corresponded approximately to 100 lbs. per acre of sulfite solids and 3.4 lbs. per acre of boron, respectively. After 5 days there was no apparent effect, and the spray applications were repeated in each plot with the same quantities of solutions, as indicated above. Twenty days after the original spraying, the plants treated with sulfite liquor alone were vigorous and healthy. The plants treated with borax alone showed a curling and shriveling of the leaves and progressive dying of the tissue extending from the tips to the middle of the leaves in many cases. The plants treated with both sulfite liquor and borax showed some curling and shriveling of the leaves, but to a considerably lesser extent than in the plot treated with borax alone, and only some very tips of the leaves were browned; they were also of a deeper and healthier green than the plants treated with borax alone. Hence, it was noted that the treatment of young tomato plants with the sulfite waste liquor effectively counteracted and substantially inhibited the poisoning by boron.

*Example 3*

Irrigation water containing about 3 p. p. m. of boron was treated at the rate of 40 lbs. by weight of the same sulfite spent liquor solids, as described in Example 1, per million pounds of water, the sulfite liquor being employed in form of a 30% concentrate and added directly into the irrigation sump. Thus, the ratio of sulfite liquor solids to boron in the irrigation water was approximately 13 to 1. A test plot of about one acre on which red, thin skinned potatoes were planted, was then irrigated with the treated water for a period of 40 days. Three adjacent one acre control plots planted with the same potatoes were also irrigated during this period of time with the same irrigation water without any sulfite liquor added thereto. At the end of this time, it was observed that the potato plants grown on the three untreated control plots had pronounced boron burns on the leaf perimeters, whereas the plants grown in the treated test plot were vigorous and healthy.

Furthermore, they were noticeably free of boron burns, much greener, about two inches higher than those in the untreated plots. The wet ash assay on the leaves of untreated control plants averaged 157 p. p. m. of boron, while the same assay on the leaves of sulfite liquor-treated plants was 77 p. p. m. boron. The plots irrigated with untreated water produced in average 73 one-hundred pound sacks of potatoes, whereas the test plot irrigated with sulfite-liquor-treated water produced 89 one-hundred pound sacks of potatoes. From this large scale field trial, it was noted that several important benefits were realized by treating the potato plants subjected to the toxic action of boron with the constituents of spent sulfite pulping liquor. These benefits were: increased crop yield, improved vigor and health of the vines, elimination of visible marginal leaf boron burns, and decrease in the number of grotesque and misshapen potatoes.

Although I have disclosed specific examples of the composition of this invention together with specific uses of this composition, I do not intend to limit myself solely thereto. As hitherto stated, the proportions of my composition may be varied according to the specific boron toxicity problem, and the composition of my invention may be used for control of boron poisoning in various plants, without departing from the essential features of the invention.

I claim:

1. A process for controlling boron poisoning in plants growing in soil containing a phytotoxic excess of boron, which comprises treating said plants with the constituents of sulfite spent pulping liquor whereby the phytotoxic action of boron is substantially inhibited.

2. A process for controlling boron poisoning in plants which comprises applying to the soil surrounding a plant, said soil containing boron in a quantity toxic to said plant, the constituents of sulfite spent pulping liquor in an amount sufficient to substantially inhibit the phytotoxic action of boron.

3. A process for controlling boron poisoning in plants which comprises treating the irrigation water in which boron is present in a quantity toxic to plant life with the constituents of sulfite spent pulping liquor in an amount sufficient to substantially inhibit the phytotoxic action of boron, and applying the treated irrigation water to the soil surrounding a plant.

4. A process for controlling boron poisoning in plants growing in soil containing a phytotoxic excess of boron, which comprises treating said plants with the constituents of ammonium-base sulfite spent pulping l liquor whereby the phytotoxic action of boron is substantially inhibited.

5. The method for treating plants growing in soil containing a phytotoxic excess of boron, which comprises spraying said plants with a solution containing the constituents of sulfite spent pulping liquor.

6. The method for controlling boron poisoning in plants growing in soil containing boron in an amount toxic to said plants, comprising applying to the soil surrounding said plants the constituents of sulfite spent pulping liquor in an amount sufficient to inhibit the phytotoxic action of said boron on said plants while leaving residually in said soil beneficial boron in an amount less than that which is toxic to said plants.

7. The method for controlling boron poisoning in plants growing in soil containing a phytotoxic excess of boron, comprising treating said plants with the constituents of sulfite spent pulping liquor in an amount of about 1 to 50 parts by weight of sulfite spent liquor solids to one part by weight of boron to inhibit said phytotoxic action of the boron while obviating deleterious effect on the plants.

References Cited in the file of this patent

Alderfer: "Effect of Waste Sulfite Liquor on Aggregation of Soil Particles," published March 1944 in Ind. Eng. Chem., vol. 36, No. 3, pages 272–274.

Penman: "Boron Poisoning in Citrus," published April 1949 in J. Department Agriculture, Victoria, Australia, vol. 47, No. 4, pages 181–189.

Powers: Chemical Abstracts, vol. 45, column 798-d (1951).

Annett et al.: "Utilization of Sulfite Pulp Mill Wastes," published December 1952, in Paper Industry, vol. 34, No. 9, pages 1109–1111.

Amberg: "Spent Sulphite Liquor Pollution Abatement," published February 27, 1953 in Paper Trade J., vol. 136, No. 9, pages 20, 21, 31.